… [19] [11] 4,444,215
Zukausky [45] Apr. 24, 1984

[54] MIXING VALVE

[75] Inventor: Keith E. Zukausky, St. Charles, Ill.

[73] Assignee: Eaton Corporation, Cleveland, Ohio

[21] Appl. No.: 279,763

[22] Filed: Jul. 2, 1981

[51] Int. Cl.³ .............................................. G05D 11/03
[52] U.S. Cl. .................................... 137/98; 137/597;
 137/490; 137/606
[58] Field of Search ................. 137/98, 597, 606, 607,
 137/625.4, 490, 491

[56] References Cited

U.S. PATENT DOCUMENTS

| 824,681 | 6/1906 | Ashley | 137/490 |
|---|---|---|---|
| 1,361,737 | 12/1920 | McVoy | 137/490 |
| 2,287,810 | 6/1942 | Lund | 137/625.4 |
| 3,809,109 | 5/1974 | Breiling | 137/88 |
| 4,270,570 | 6/1981 | Kolze | 137/597 |

*Primary Examiner*—Martin P. Schwadron
*Assistant Examiner*—James R. Shay
*Attorney, Agent, or Firm*—Fay & Sharpe

[57] ABSTRACT

The mixing valve includes a plurality of flow regulating assemblies (A) each of which independently regulates the flow of one of a plurality of fluids. Each flow regulating assembly includes a pressure displaceable structure (22) which is physically displaced by changes in pressure and a movable valving member (50) which is movable relative to a stationary valve seat (42) for adjusting the cross section of a flow path therebetween. The movable valving member is operatively connected with the pressure displaceable structure such that the cross section of the flow path varies generally in inverse proportion to the sensed pressure. A proportioning assembly (B) proportions back pressure from adjacent a mixed fluid outlet (132) between the flow regulating assemblies such that each flow regulating assembly regulates its fluid flow in accordance with the proportion of the back pressure accorded it. A mixed fluid selecting valve assembly C selectively connects the proportioning valve assembly with one of a plurality of mixed fluid outlets which have larger and smaller diameter sections to cause relatively low and high back pressures, hence, relatively high or low flow rates.

16 Claims, 3 Drawing Figures

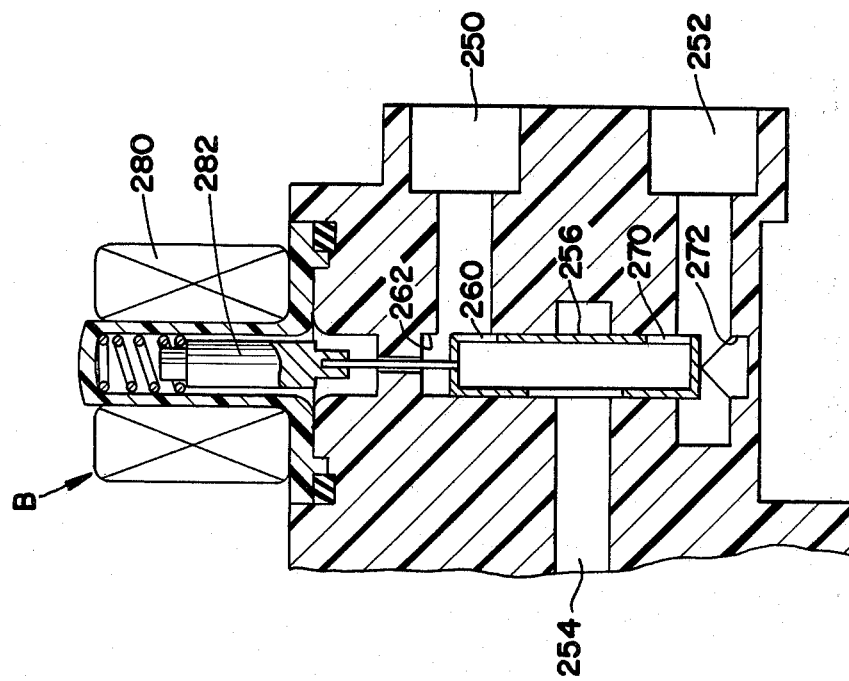
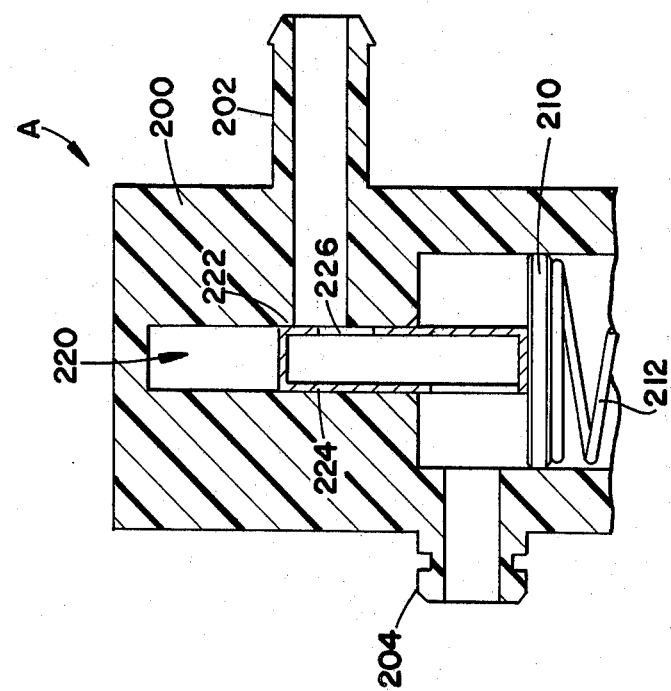
FIG. 3
FIG. 2

MIXING VALVE

BACKGROUND OF THE INVENTION

This application pertains to the art of mixing or blending valves and fluid pressure regulators. The invention is particularly applicable to mixing valves for appliances which selectively mix hot and cold water and will be described with particular reference thereto. It will be appreciated, however, that the invention has other applications where pressure regulation and selectively controlled fluid mixing are desired, such as industrial formulating operations in which the flows of a plurality of liquid constituents are continuously mixed in preselected proportions, water temperature regulators in which hot and cold water are selectively mixed to maintain a constant water temperature, or the like.

Commonly, appliance mixing valves have directly controlled the flow of incoming hot and cold water with a hot water control valve and a cold water control valve. Note for example, U.S. Pat. No. 4,270,570, issued June 2, 1981 to L. A. Kolze and assigned to the assignee herein. Further, appliance mixing valves usually supplied hot, cold, or warm water at either a high or a low flow rate. To select the high or low flow rate, a flow rate control solenoid valve selectively connected the hot and cold solenoid valves with an unrestricted or high flow rate outlet and a restricted or low flow rate outlet.

One problem with the prior art mixing valves is that the flow rate from the mixing valve varied for hot, cold and warm water. The warm water being connected with two supply lines flowed at a faster rate than either the hot or the cold. Another problem was that variations in the hot and cold water line pressures not only varied the flow rates of hot and cold water but varied the temperature of warm water.

One solution was to use flow control washers in the hot and cold water inlets which generally equalized hot and cold water flow rates even with fluctuating line pressure and stabilized the temperature of the warm water. However, the flow rate of warm water through the mixing valve was still greater than the flow rate of hot or cold water. One problem with flow control washers was that they required precision manufacturing techniques and precise engineering tolerances. The durometer of the rubber and the diameter of the flow opening had to be carefully controlled. This required relatively expensive manufacturing techniques. Even with the expensive precision manufacturing techniques, the flow control flow rates tended to vary with temperature, particularly hot and cold water. The flow control properties of the washers varied, not only with temperature, but with age. With age the rubber hardened, particularly the rubber in the hot water flow path, changing the regulated flow rate.

SUMMARY OF THE INVENTION

The present invention contemplates a new and improved mixing valve and pressure regulator which overcomes the above-referenced problems and others. It provides a valve assembly which is relatively inexpensive, yet accurately controls fluid flow rates and relative fluid flow rates over a wide range of pressures and temperatures.

In accordance with a first aspect of the invention, there is provided a mixing valve for selectively mixing a first fluid and a second fluid. A first fluid inlet is adapted to be connected with a source of the first fluid under pressure. A first regulating assembly is operatively connected with the first fluid inlet for regulating the pressure or flow of the first fluid. A second fluid inlet is adapted to be connected with a source of the second fluid under pressure. A flow regulating assembly is operatively connected with the second fluid inlet for regulating the pressure or flow of the second fluid. There is at least one mixed fluid outlet for discharging the first and second fluids. A back pressure is developed in the discharged fluids adjacent the mixed fluid outlet. A fluid pressure proportioning means is disposed between the mixed fluid outlet and the first and second regulating assemblies for selectively proportioning the back pressure between them. In this manner, the back pressure determines the flow rate of the mixed fluid and the proportioning means causes the first and second regulating assemblies to control the relative flow rates of the first and second fluids.

In accordance with another aspect of the invention, there is provided a flow regulating assembly comprising a valve housing that has an inlet which is adapted to be connected with a source of fluid under pressure, an outlet which is adapted to be connected with a flow control or mixing valve, and a valve seat disposed between the inlet and the outlet. A pressure sensing means is disposed in the valve housing for sensing the fluid pressure adjacent the outlet. A movable valving member is disposed adjacent the valve seat between the inlet and a pilot reservoir. The movable valving member is urged by fluid pressure adjacent the inlet to move away from the valve seat. A pilot supply aperture connects the inlet and the pilot reservoir and a pilot outlet aperture which is larger in cross section than the pilot supply aperture connects the pilot reservoir with the outlet. A pilot valve for controlling the fluid flow through the pilot aperture is operatively connected with the pressure sensing means to vary the fluid flow in response to sensed pressure variations.

A primary advantage of the present invention is that it accurately controls the relative amounts of continuously mixed fluid components.

Another advantage of the present invention is that it accurately controls fluid flow rate without expensive flow control washers.

Still further advantages will become apparent upon reading and understanding the following detailed description of the preferred embodiment.

DESCRIPTION OF THE DRAWINGS

The present invention may take form in various parts and arrangements of parts. The FIGURES herein are only for purposes of illustrating a preferred embodiment of the present invention and are not to be construed as limiting the invention.

FIG. 2 illustrates an alternate embodiment of a flow regulating assembly in accordance with the present invention; and FIG. 3 illustrates an alternate embodiment of a proportioning valve assembly in accordance with the present invention.

DETAILED DESCRIPTION OF THE PREFERRED EMBODIMENT

Figure 1:
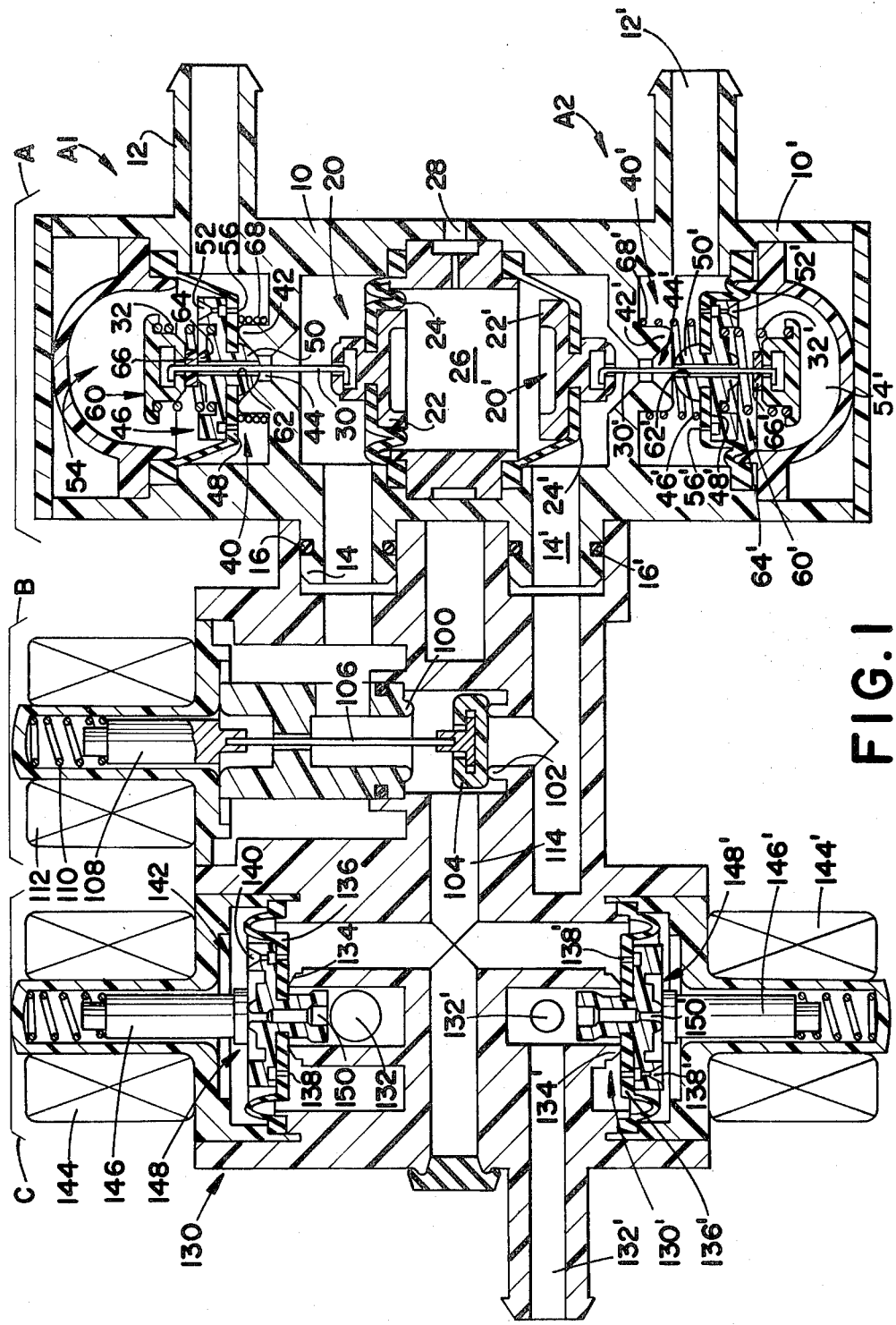
FIG. 1 is a side sectional view of a mixing valve assembly in accordance with the present invention.

With reference to FIG. 1, a mixing valve in accordance with the present invention includes a plurality of regulating assemblies A for independently regulating the pressure or flow rates of a plurality of fluids. In the preferred embodiment, the regulating assembly includes a first or cold water regulating assembly A1 for regulating the flow of cold water to a preselected substantially constant flow rate by regulating its pressure to a preselected regulated pressure and a second or hot water flow regulating assembly A2 for regulating the flow of hot water to the preselected substantially constant flow rate by regulating its pressure to the preselected regulated pressure. Optionally, the regulating assemblies A may include additional regulating assemblies for regulating the flow of additional fluids as is appropriate to the environment in which the mixing valve is used. A fluid pressure proportioning means B proportions the back pressure, i.e. fluid pressure within the mixing valve, between the hot and cold water or additional regulating assemblies. In this manner the magnitude of the back pressure determines the total flow rate of all fluids mixed together and the proportioning means causes the first and second regulating assemblies to control the relative flow of hot and cold water and other fluids. A mixed fluid flow rate selecting means C selects the flow rate of the mixed fluids. More specifically, the mixed fluid flow selecting means selectively adjusts the back pressure in the mixing valve to select the total mixed fluid flow rate and to cause the plurality of regulating assemblies each to adjust its flow in accordance with the proportion selected by the proportioning means B.

In the embodiment of FIG. 1, the flow regulating assembly A includes two regulating assemblies—the first or cold water regulating assembly A1, and the second or hot water regulating asembly A2. For simplicity of illustration and because each of the regulating assemblies is the same, the first or cold water regulating assembly A1 is described in detail and it is to be appreciated the description applies equally to the second or hot water regulating assembly A2 and, where appropriate, additional regulating assemblies. Corresponding parts of the hot and cold water flow regulating assemblies are identified with the same reference with the parts of the hot water regulating assembly being followed by a prime (').

The first regulating assembly includes a valve housing 10 having a fluid inlet 12 and a fluid outlet 14 with an O-ring seal 16. Disposed adjacent the outlet 14 is a pressure sensing means 20 for sensing the fluid pressure adjacent the outlet. The pressure sensing means includes a pressure responsive structure 22 which is physically displaced by changes in pressure. A diaphragm 24 is disposed between the displaceable structure 22 and an atmospheric pressure cavity 26 which is vented to the atmosphere by a vent passage 28. The displaceable structure 22 is connected by a connecting rod 30 with a biasing spring 32. This allows the displaceable structure 22 to move until the pressure across the sensing diaphragm reaches a preselected regulated pressure. The regulated pressure is equal to the spring force of spring 32 and sensing diaphragm 24 divided by the area of the sensing diaphragm 24. Because, as is explained below, the spring 32 remains in substantially the same state of compression over a wide range of inlet pressures, the regulated pressure is substantially constant, hence the flow rate through the fixed cross-section outlet 14 is substantially constant. Other structures which are physically displaced by changes in fluid pressure, such as bellows, spring biased pistons, or the like, are also contemplated.

Also disposed between the inlet 12 and outlet 14 is an adjustable valving means 40 which provides a flow path of adjustable cross section to fluid moving from the inlet 12 to the outlet 14. The adjustable valving means 40 selectively varies the flow path cross section to regulate the fluid flow to maintain the sensed pressure at the preselected regulated pressure. The adjustable valving means 40 is connected with the pressure sensing means 20 such that increases in the sensed pressure decrease the flow path cross section, and decreases in the sensed pressure increase the flow path cross section. The adjustable valving means 40 includes a stationary valve seat 42 with a fluid passage 44 extending therethrough and a movable valving member 46 which moves relative to the stationary valve seat 42 to adjust the cross section of the flow path therebetween. The movable valving member 46 includes a valving diaphragm 48 which seats against the valve seat 42 in a sealing relationship when no flow of the fluid is to be permitted. The valving diaphragm 48 has a first face disposed adjacent the inlet 12 for being biased by inlet fluid pressure away from the valve seat 42. The movable valving member also includes a domed or conical flow regulating projection 50 which with the stationary valve seat 42 defines the variable cross section flow path. The moveable valving member 46 has a pilot supply aperture 52 in fluid communication between the inlet 12 and a pilot reservoir 54 defined by a pilot reservoir defining means or portion of the housing 10. Any difference in the pilot reservoir pressure and the inlet pressure causes the valving diaphragm 48 to shift in a manner which tends to equalize the pressure differential. A plurality of filtering apertures 56 which are smaller than the pilot aperture 52 filter the fluid flowing from the inlet to the pilot reservoir.

The connecting rod 30 also connects the pressure sensing means 20 with a pilot valve structure 60 for modulating the fluid flow from the pilot reservoir to maintain a generally constant pressure differential across the valving diaphragm 48. The moveable valving member 46 or other suitable means defines a pilot outlet aperture 62 which is larger than the pilot supply aperture 52 and a surrounding pilot valve seat 64. A pilot valving member 66 modulates the flow rate through the pilot outlet aperture 62. The pilot valving member 66 is biased away from the pilot seat 64 by the spring or biasing means 32 and is connected with the connecting rod 30 to be moved toward or away from the pilot valve seat in response to increases or decreases in the sensed pressure. The equalibrium inlet-pilot reservoir pressure differential maintained by the pilot valve structure 60 is equal to the spring force of spring 32 and valving diaphragm 48 divided by the area of the valving diaphragm 48.

The pilot valve structure 60 is dimensioned such that relatively little travel between pilot valve seat 64 and pilot valving member 66 balances the flow rate through pilot outlet aperture 62 with the flow rate through the pilot supply aperture 54. Because this travel is short, the spring force of the spring 32 remains substantially constant over the full stroke of the adjustable valving means 40 and the actual spring constant is relatively unimportant. Optionally, a counter biasing spring 68 may be used to reduce the required size of the valving diaphragm 48 and still provide sufficient flow at very low inlet pressures. For applications with extreme differences in the first and second fluid pressures, the vent 28 may be reduced or eliminated. With the vent 28 eliminated, positioning the adjustable valving means near the valve seat on the high pressure side causes the pressure sensing diaphragm to compress the air in pressure cavity 26. This increases the reference pressure, hence the regulated pressure and the flow rate of the low pressure fluid.

In operation, when a flow control valve downstream of outlet 14 is shut off, the flow regulating valve assembly assumes a position shown by the first regulating assembly A1. When the downstream control valve is opened, the pressure on pressure sensing diaphragm 24 is reduced and the displaceable structure 22 rises. As the connecting rod 30 rises, the pilot valve 60 is opened allowing fluid to flow from the pilot reservoir 54 into outlet 14. As fluid flows from pilot reservoir 54, a pressure differential between the pilot reservoir 50 and inlet 12 is caused which lifts the valving diaphragm 48. This opens the flow path 44 through the adjustable valving means 40. The flow through the path 42 increases the pressure on the sensor diaphragm 24 moving it downward. Downward movement of the displaceable structure 22 restricts the pilot valve 60 to reestablish the equilibrium inlet-pilot reservoir pressure differential. This change in the inlet-pilot reservoir pressure differential moves valving member 46 toward the valve seat 42. Quickly, an equilibrium position between the flow regulating projection 50 and the valve seat 42 and between the pilot valving member 66 and pilot valve seat 64 is reached in which the regulated pressure is achieved at the outlet 14. If the inlet pressure decreases, the pressure on sensing diaphragm 24 similarly decreases allowing the diaphragm to lift. As the connecting rod 30 is lifted with the displaceable structure 22, the pilot valve is opened further and the fluid pressure in the pilot reservoir is reduced. This change in the inlet-pilot reservoir pressure differential causes the adjustable valving member 46 to move away from the valve seat 42 increasing the flow through path 44 and moves the pilot valve seat 64 toward the pilot valving member 66 restricting the pilot outlet flow until the equilibrium condition is again reached. When the flow control valve downstream from the outlet 14 is shut off, the pressure sensed by the pressure sensor diaphragm 24 exceeds the regulated pressure moving it downward closing the pilot valve outlet. Through the pilot supply aperture 54 the pressure between the inlet 12 and the pilot reservoir 54 reaches equilibrium stabilizing the adjustable valving member 46 in its closed position. The spring force of the spring 32 and the valving diaphragm 48 and the difference between the inlet and regulated pressures combine with the relatively large area of the valve seat 42 to close the adjustable valving means 40. Even if the valving means 40 fails to close the downstream flow control valve is closed so there is no leakage.

With continued reference to FIG. 1, the proportioning means B includes a pair of oppositely disposed valve seats 100 and 102. The first valve seat 100 is connected with the outlet 14 of the first or cold water flow regulator assembly A1 and the seal valve seat 102 is connected with outlet 14' of the second or hot water flow regulator assembly A2. A proportioning valve member 104 is configured for selectively assuming (1) a sealing relationship with valve seat 100, (2) a sealing relationship with valve seat 102, or (3) a position between the two valve seats. The proportioning valve member 104 is connected by a proportioning valve connecting rod 106 with a proportioning valve armature 108. The proportioning valve member 104 is biased toward the valve seat 102 by a spring 110. A proportioning control means including a solenoid 112 is adapted to draw the armature 108 against the spring 110 drawing the proportioning valve member 104 toward valve seat 100.

To select cold water only, the solenoid coil 112 receives no actuating potential. The spring 110 biases the proportioning valve member 104 against hot water valve seat 102 and allows cold water to pass through the first flow regulating assembly A1 and valve seat 100 to a proportioning means outlet 114. The direct fluid connection between proportioning means outlet 114 and the sensing diaphragm 24 causes the fluid pressure at the proportioning means outlet 14 to be sensed by the diaphragm 24. When only hot water is to be supplied, the solenoid 112 receives a full actuating current causing the proportioning valve member 104 to seat against valve seat 100. Hot water flows from the hot water inlet 12' through the second flow regulating assembly A2 and valve seat 102 to the proportioning means outlet 114. The pressure at the proportioning means outlet 114 is sensed by the diaphragm 24' such that the hot water flows with the same preselected flow rate as did the cold water.

When warm water is to be selected, a partial, A.C. actuating potential is received by the solenoid coil 112. The A.C. actuating potential is selected to be such a magnitude that valve member 104 is raised toward valve seat 100 but oscillates about a neutral position generally midway between valve seats 100 and 102. As the proportioning valve member 104 oscillates, the pressure at the proportioning means outlet 114 is proportioned generally equally between the diaphragms 24 and 24'. This effectively splits the pressure between the hot water and cold water flow regulating assemblies such that the flow rate of warm water through the proportioning means outlet 114 is substantially the same as the flow rate of hot water alone or cold water alone. Alternately, the proportioning valve member 104 may be biased to positions more near valve seat 100 to cause a higher percentage of cold water or more near valve seat 102 to form a higher percentage of hot water in the mixed fluid flow through the proportioning means outlet 114. In such an alternate embodiment, the surface of valve member 104 adjacent to valve seats 100 and 102 are domed for defining a more precise and more limited flow paths therebetween.

The mixed fluid flow rate selecting means C includes electrically operated valving means for selecting one of a plurality of flow rates or back pressures. The mixed fluid flow rate selecting means C includes a high flow rate selecting valve 130 and a low flow rate selecting valve 130' which are disposed between the blending valve outlet 114 and a high flow rate mixed fluid outlet 132 and a low flow rate mixed fluid outlet 132', respectively. For simplicity of illustration, the high flow rate valve is described in detail and it is to be appreciated that the description applies by analogy to the low flow rate valve in which like parts are marked with the same reference numeral followed by a prime ('). The valve assembly 30 includes a stationary valve seat 134 and a movable outlet valve member 136. Outlet pilot supply passages 138 and 140 allow the fluid pressure at proportioning means outlet 14 and a reservoir 142 to come into equilibrium. To open the valve 130, a solenoid coil 144 receives an appropriate biasing potential to lift an armature 146. The armature 146 is connected with a pilot valve assembly 148 which allows the fluid in reservoir 142 to flow to the mixed fluid outlet 132 through a pilot outlet passage 150. This unbalances the pressure equilibrium between proportioning means outlet 114 and reservoir 142 allowing the pressure from the proportioning means outlet 114 to lift the outlet valve member 136. This provides fluid communication with the high flow rate, mixed fluid outlet 132. The flow rate is determined by the diameter of the mixed fluid outlet 132.

The low flow rate outlet 132' is smaller in diameter than the high flow rate outlet 132. This smaller diameter outlet increases back pressure, hence the fluid pressure at proportioning means outlet 114 which, in turn, reduces the flow rates of the hot and cold water flow regulating assemblies. In this manner, the low flow rate is caused. In the preferred embodiment, the low flow rate valve assembly has two outlet nipples. The exact number of outlet nipples, of course, is determined by the appliance with which the valve is used and may be a single outlet or a plurality of outlets.

Alternately, the mixed fluid flow rate selecting means C may include a rotatable valve shaft which at each of a plurality of preselected angular positions connects the proportioning means outlet 114 with a mixed fluid outlet through a different sized flow restrictor. Each flow restrictor is sized with a different diameter passage to create different back pressures, hence, different mixed fluid outlet rates.

With reference to FIG. 2, an alternate regulating assembly A is illustrated. The regulating valve assembly includes a valve housing 200 which has a fluid inlet 202 and a fluid outlet 204. Disposed adjacent the outlet 204 is a pressure sensing means 210 for sensing the fluid pressure adjacent the outlet. The pressure sensing means 210, in the embodiment of FIG. 2, is a piston or other structure which is displaceable in response to fluid pressure against the biasing of a spring 212. An adjustable valving means 220 selectively varies the cross section of the flow path between the inlet 202 and the outlet 204. The adjustable valving means includes a stationary valve seat 222 connected with the inlet 202 and a movable valving member 222 which is movable relative to the valve seat to adjust the flow therebetween. The movable valving member has an inlet 226 which is disposed adjacent the valve seat 222 such that their degree of coincidence determines the relative flow therethrough. As the valve seat 222 and aperture 226 moves into full coincidence, the maximum flow is permitted. When the piston 210 moves the movable valving member such that valve seat 222 and aperture 226 are in partial coincidence, a reduced flow is permitted. When the piston moves sufficiently that there is no coincidence between the valve seat and the aperture 226, the flow rate is blocked.

Various other pressure sensing means and adjustable valving means combinations may be utilized. For example, the pressure sensing means may undergo rotational movement in response to changes in pressure and the adjustable valving means may be configured to vary its flow rate as a function of angular position.

FIG. 3 illustrates an alternate embodiment of a proportioning means B in accordance with the present invention. The proportioning means has a hot water inlet 250, a cold water inlet 252, and a proportioning means outlet 254. A proportioning valve member 256 controls the flow from the hot and cold water inlets 250 and 252. The proportioning valve member 256 has an aperture 260 which is adapted to be disposed in coincidence to a valve seat 262. By selectively varying the amount of coincidence between the aperture 260 and the valve seat 262, the relative flow rate of hot water can be varied. Similarly, the proportioning valve member 256 has a second aperture 270 which is adapted to be disposed in coincidence with a valve seat 272. Again, the degree of coincidence between the aperture 270 and the valve seat 272 determines a relative flow rate of cold water. The relative positions of the apertures 260 and 270 to their valve seats 262 and 272 is such that the sum of the area of coincidence between the aperture 260 and valve seat 262 with the area of coincidence between aperture 270 and valve seat 272 is always the same. In this manner, the total flow rate through the blending valve is the same although the proportions of hot and cold may be varied. By providing the appropriate D.C. bias to a solenoid coil 280, the position of an armature 282 which is connected to the proportioning valve member 256 may be selected such that the relative proportions of hot and cold are accurately selected.

Alternately, the valve member 256 may have generally triangular openings and be rotatable relative to stationary valve seats such that as a valve member 256 is rotated, the relative amount of coincidence between one of the apertures and its associated valve seat increases as the amount of coincidence between the other aperture and its associated valve seat decreases.

The invention has been described with reference to the preferred and alternate embodiments. Obviously, modifications and alterations will occur to others upon a reading and understanding the preceding detailed description of the preferred embodiment. It is intended that the invention include all such alterations and modifications which come within the scope of the appended claims or the equivalents thereof.

Having thus described a preferred and alternate embodiments of the invention, the invention is now claimed to be:

1. A mixing valve for selectively mixing a first incompressible fluid and a second incompressible fluid, the mixing valve comprising:
   means defining a first fluid inlet which is adapted to be connected with a source of the first incompressible fluid under pressure;
   a first regulating assembly operatively connected with the first fluid inlet means for regulating the rate of flow of the first fluid therethrough so as to maintain a generally constant first preselected pressure adjacent a means for defining a first regulator outlet, whereby the pressure and flow rate of the first incompressible fluid through the first regulator outlet is substantially independent of the pressure of the first incompressible fluid at the first fluid inlet;
   means for defining a second fluid inlet which is adapted to be connected with a source of the second incompressible fluid under pressure;
   a second regulating assembly operatively connected with the second fluid inlet means for regulating the flow of the second fluid therethrough so as to maintain a generally constant second preselected pressure adjacent a means for defining a second regulator outlet, whereby the pressure and flow rate of the second incompressible fluid through the second regulator outlet is substantially independent of the pressure of the second incompressible fluid at the second fluid inlet;

fluid pressure proportioning means disposed between the first and second regulator outlets and a proportioning means outlet for selectively proportioning a back pressure at the proportioning means outlet between the first and second regulator outlets without controlling fluid flow therethrough, the proportioning means causing the first and second regulating assemblies to control the relative flow rates of the first and second incompressible fluids such that the first preselected pressure is maintained in the first regulator outlet and the second preselected pressure is maintained in the second regulator outlet, whereby the total flow rate of the first and second incompressible fluids mixed together and the back pressure in the proportioning means outlet remains substantially constant as the proportioning means varies the proportion of the first and second incompressible fluids;

proportioning control means for selectively controlling the fluid pressure proportioning means to vary the proportioning of the back pressure between the first and second regulating assemblies, whereby the proportioning control means indirectly causes the first and second regulating assemblies to control the relative flow rates of the first and second incompressible fluids;

mixed fluid flow rate selecting means for selectively restricting a flow path downstream from the proportioning means outlet, such that restricting the flow path tends to increase the back pressure in the proportioning means outlet causing the first and second regulating assemblies to decrease the fluid flow therethrough to hold the first and second preselected pressures and the back pressure substantially constant and such that enlarging the flow path tends to decrease the back pressure in the proportioning means outlet causing the first and second regulating assemblies to increase the fluid flow therethrough to hold the first and second preselected pressures and the back pressure substantially constant, whereby the mixed flow rate selecting means varies the total flow rate without varying the relative flow rates of the first and second incompressible fluids;

whereby the proportioning means and the mixed fluid flow rate selecting means act on the mixed first and second incompressible fluid downstream from the first and second regulating assemblies to cause the first and second regulating assemblies to control the relative and total flow rates of the first and second incompressible fluids.

2. The mixing valve as set forth in claim 1 wherein the first and second preselected pressures are substantially equal.

3. The mixing valve as set forth in claim 1 wherein the fluid pressure proportioning means includes a first proportioning valve seat in fluid communication with the first regulator outlet, a secod proportioning valve seat in fluid communication with the second regulator outlet, and a proportioning valve member disposed for movement relative to the first and second proportioning valve seats, the proportioning control means selectively controlling the movement of the proportioning valve member.

4. The mixing valve as set forth in claim 3 wherein the proportioning valve member is movably disposed to assume at least a first position adjacent the first proportioning valve seat and displaced from the second proportioning valve seat in which the second fluid passes through the proportioning means outlet, a second position in which the proportioning valve member is diposed adjacent the second proportioning valve seat and displaced from the first proportioning valve seat such that the first fluid passes through the proportioning means outlet, and a third valve position in which the proportioning valve member is displaced from the first and second proportioning valve seats such that a mixture of the first and second fluids passes through the proportioning means outlet.

5. The mixing valve as set forth in claim 4 wherein the proportioning control means oscillates the proportioning valve member in the third position to damp fluctuations in the back pressure proportioned by the proportioning means to the first and second regulating assemblies.

6. The mixing valve as set forth in claim 1 wherein the first and second regulating assemblies each include:
a valve seat disposed between the inlet means and the outlet means;
a pressure sensing means disposed between the valve seat and the proportioning means; and,
a movable valving member disposed adjacent the valve seat for defining a flow path with an adjustable cross section therebetween, the movable valving member being disposed between the inlet means and a means for defining a pilot reservoir, a means defining a pilot supply aperture in fluid connection between the inlet and the pilot reservoir, a means defining a pilot outlet aperture which is larger in cross section than the pilot supply aperture for selectively releasing fluid from the pilot reservoir and a pilot valve for controlling fluid flow through the pilot outlet aperture, the pilot valve being operatively connected with the pressure sensing means to vary the fluid flow through the pilot outlet aperture in response to variations in the sensed pressure.

7. The mixing valve as set forth in claim 6 further including a damping chamber disposed between the pressure sensing means of the first and second regulating assemblies, the damping chamber limiting the speed at which the pressure sensing means respond to changes in pressure, whereby the damping chamber inhibits sudden pressure changes from throwing the first and second regulating assemblies into oscillating or rapidly changing modes.

8. A flow regulating assembly for maintaining pressure of an incompressible fluid substantially constant over a range of flow rates comprising:
a valve housing including means defining an inlet which is adapted to be connected with a source of incompressible fluid under pressure, means defining an outlet, and a regulator valve seat disposed between the inlet means and the outlet means;
a pressure sensing means disposed in the valve housing adjacent the outlet for sensing fluid pressure;
a movable regulator valving member disposed adjacent the regulator valve seat for controlling fluid flow therethrough;
a valving diaphragm defining in conjunction with a portion of the housing a pilot reservoir, the movable regulator valving member being urged by fluid pressure adjacent the inlet means to move away from the regulator valve seat and by fluid pressure in the pilot reservoir to move toward the regulator valve seat;

means defining a pilot supply aperture between the inlet means and the pilot reservoir;

means for defining a pilot outlet aperture which is larger in cross section than the pilot supply aperture, the pilot outlet aperture extending through the movable regulator valving member between the pilot reservoir and the outlet means;

a pilot valve for controlling flow through the pilot outlet aperture, the pilot valve including: a pilot valve seat disposed on the movable regulator valving member surrounding the pilot outlet aperture and a pilot valving member which is movable relative to the pilot valve seat, such that causing the fluid to flow through the pilot outlet aperture faster than the fluid flows through the pilot supply aperture decreases pressure in the pilot reservoir moving the valving member away from valve seat increasing the flow rate of the fluid therethrough and causing the fluid to flow through the pilot outlet aperture slower than the fluid flows through the pilot supply aperture increases the pressure in the pilot reservoir moving the valving member toward the valve seat decreasing the flow rate of the fluid therethrough;

means for connecting the pilot valving member with the pressure sensing means, such that the movable regulator valving member and the pressure sensing means move in response to variations in the sensed out fluid pressure adjacent the outlet to vary the flow through the pilot outlet aperture such that the sensed pressure at the outlet is held generally constant; and, a biasing spring means for regulating fluid pressure adjacent the outlet in accordance with its spring force, the biasing spring means being connected between the pilot valve seat and the pilot valving member to bias the pilot valve open, the biasing spring means moving as a whole with the movable regulator valving member and the pressure sensing means such that the biasing spring means has substantially the same degree of compression with any equilibrium flow rate, whereby, the pilot valve controls the flow rate through the outlet such that the pressure sensed by the pressure sensing means counter balances the spring force of the biasing spring means.

9. The flow regulator assembly as set forth in claim 8 further including filter means adjacent the pilot inlet aperture means to protect the pilot inlet aperture from particles.

10. The flow regulator assembly as set forth in claim 8 wherein the pressure sensing means includes a diaphragm having a first side in communication with fluid adjacent the outlet and a second side in communication with a damping chamber for damping the speed at which the pressure sensing diaphragm moves in response to sudden pressure changes adjacent the outlet.

11. A mixing valve for providing a mixture of a first incompressible fluid and a second incompressible fluid selectively at one of a plurality of flow rates and in a selectable proportion such that the flow rate is selectively changeable without affecting the proportion and the proportion is selectively changeable without affecting the flow rate, the flow rate of the mixed fluid and the proportion of the first and second fluids being substantially unaffected by variations in the pressure at which the first and second fluids are supplied to the mixing valve, the mixing valve comprising:

a housing defining a first fluid inlet which is adapted to be connected with a source of the first fluid under pressure and defining a first regulator outlet;

a first regulating assembly for regulating the flow rate of the first fluid such that the first fluid is discharged from the first regulating assembly at a first preselected pressure, the first regulating assembly including:

a first regulator valve seat disposed between the first inlet and the first regulator outlet, a first movable regulator valving member for controlling the rate of first fluid flow through the first regulator valve seat, a first valving diaphragm operatively connected with the first regulator valving member and with a first portion of the housing to define a first pilot reservoir therebetween, means for defining a first pilot supply aperture connected between the first inlet and the first pilot reservoir to supply the first fluid to the first pilot reservoir, means for defining a first pilot outlet aperture connected between the first pilot reservoir and the first regulator outlet to remove the first fluid from the first pilot reservoir, a first pilot valve for controlling the rate of flow of the first fluid through the first pilot outlet aperture such that causing the first fluid to flow through the first pilot outlet aperture faster than the first fluid flows through the first pilot supply aperture decreases pressure in the first pilot reservoir moving the first regulator valving member away from first regulator valve seat increasing the flow rate of the first fluid therethrough and such that causing the first fluid to flow through the first pilot outlet aperture slower than the first fluid flows through the first pilot supply aperture increases the pressure in the first pilot reservoir moving the first regulator valving member toward the first regulator valve seat decreasing the flow rate of first fluid therethrough, first pressure sensing means for sensing fluid pressure adjacent the first regulator outlet, and first pressure sensing means controlling the first pilot valve such that the first preselected pressure of the first fluid adjacent the first regulator outlet is substantially constant;

the housing further defining a second fluid inlet which is adapted to be connected with a source of a second fluid under pressure and defining a second regulator outlet;

a second fluid regulating assembly for regulating the flow rate at which the second fluid passes therethrough such that the second fluid is discharged therefrom with a second preselected fluid pressure, the second regulating assembly including:

a second regulator valve seat disposed between the second fluid inlet and the second regulator outlet, a second movable regulator valving member for controlling the rate of second fluid flow through the second regulator valve seat, a second valving diaphragm operatively connected with the second regulator valving member and with a portion of the housing to define a second pilot reservoir therebetween, means for defining a second pilot supply aperture connected between the second inlet and the second pilot reservoir to supply the second fluid to the second pilot reservoir, means for defining a second pilot outlet aperture connected between the second pilot reservoir and the second regulator outlet to remove the second fluid from the second pilot reservoir, a second pilot valve for controlling the rate of flow of the second fluid through the second pilot outlet aperture such that causing the second fluid to flow through the second pilot outlet aperture faster than the second fluid flows through the second pilot supply aperture decreases pressure in the second pilot reservoir moving the second regulating valving member away from second regulator valve seat increasing the flow rate of the second fluid therethrough and such that causing the second fluid to flow through the second pilot outlet aperture slower than the second fluid flows through the second pilot supply aperture increases the pressure in the second pilot reservoir moving the second regulator valving member toward the second regulator valve seat decreasing the flow rate of second fluid therethrough, second pressure sensing means for sensing fluid pressure adjacent the second regulator outlet, the second pressure sensing means controlling the second pilot valve such that the second preselected pressure of the second fluid adjacent the second regulator outlet is substantially constant;

fluid pressure proportioning means operatively connected with the first and second regulator outlets and a proportioning means outlet for selectively proportioning a back pressure at the proportioning means outlet between the first and second regulator outlets without controlling the fluid flow rate therethrough, the proportioning means selectively proportioning the back pressure between the first and second pressure sensing means such that the first and second regulating assemblies adjust the flow rate of the first and second fluids therethrough in such a manner that said first preselected pressure is maintained at the first regulator outlet, said second preselected pressure is maintained at the second regulator outlet, and the back pressure at the proportioning means outlet is maintained substantially constant;

a first pilot operated valve for selectively connecting a first mixed fluid outlet having a first internal cross section fluidically in series with the proportioning means outlet such that opening the first pilot operated valve allows fluid to flow from the proportioning means outlet through the first mixed fluid outlet, whereby opening and closing the first pilot operated valve tends to cause a variation in the back pressure at the proportioning means outlet which in turn tends to cause a variation in the pressure at the first and second regulator outlets in response to which the first and second pressure regulating means adjust the flow of the first and second fluids such that the first preselected pressure is maintained at the first regulator outlet, the second preselected pressure is maintained at the second regulator outlet and the back pressure at the proportioning means outlet is maintained substantially constant; and, a second pilot operated valve for connecting a second mixed fluid outlet of a second preselected internal cross section fluidically in series with the proportioning means outlet such that opening the second pilot operated valve allows fluid to flow from the proportioning means outlet through the second mixed fluid outlet, the first and second mixed fluid outlets receive fluid at the substantially contant back pressure and have different internal cross sections such that fluid is discharged from the first and second mixed fluid outlets at different flow rates;

whereby the first and second regulating assemblies control the flow rates of the first and second fluids to maintain the first and second fluid flow rates in a proportion as selected by the proportioning means and in a total flow rate as selected by the first and second pilot valves.

12. The mixing valve as set forth in claim 11 wherein the first pressure sensing means includes a first pressure responsive diaphragm and the second pressure sensing means includes a second pressure responsive diaphragm and further including a damping reservoir disposed between the first and second pressure responsive diaphragms.

13. The mixing valve as set forth in claim 11 wherein the first pilot valve includes a first pilot valve seat disposed on the first regulator valving member, a first pilot valving member operatively connected with the first pressure sensing means and disposed for movement relative to the first pilot valve seat, and a first biasing spring disposed between the first pilot valving member and the first regulator valving member, first biasing spring controlling the first preselected pressure and wherein the second pilot valve includes a second pilot valve seat disposed on the second regulator valving member, a second pilot valving member operatively connected with the second pressure sensing means and disposed for movement relative to the second pilot valve seat, and a second biasing spring disposed between the second pilot valving member and the second regulator valving member, the second biasing spring controlling the second preselected pressure.

14. The mixing valve as set forth in claim 13 wherein the first and second biasing spring have substantially equal spring constants such that the first and second preselected pressures are substantially the same.

15. The mixing valve as set forth in claim 11 further including a first filter means between the first inlet and first pilot supply aperture and a second filter means between the second inlet and the second pilot supply aperture.

16. A method of mixing a first incompressible fluid with a second incompressible fluid at a selectable flow rate and in a selectable proportion such that the flow rate is selectively changeable without affecting the selected proportion and the proportion is selectively changeable without affecting the selected flow rate, the method comprising:

sensing the pressure of a first incompressible fluid;

regulating a flow rate of the first incompressible fluid such that the first incompressible fluid maintains a preselected pressure;

sensing the pressure of a second incompressible fluid concurrently with sensing the pressure of the first incompressible fluid;

regulating a flow rate of the second incompressible fluid such that the second incompressible fluid maintains the preselected pressure;

combining the flow regulated first and second fluids into a mixed fluid flow, such that the mixed fluid flow has a back pressure, whereby the back pressure is proportional to the preselected pressure;

selectively adjusting a cross section of a mixed fluid flow path such that restricting the mixed fluid flow path cross section tends to increase the back pressure and enlarging the mixed fluid flow path cross section tends to decrease the back pressure;

decreasing the first and second incompressible fluid flow rates in response to an increase in the back pressure to maintain the preselected pressure and the back pressure substantially constant and increasing the first and second incompressible flow rates in response to a decrease in the back pressure to maintain the preselected pressure and the back pressure substantially constant, whereby the mixed fluid flow rate is selectively adjusted by the regulation of the first and second imcompressible fluid flow rates without adjusting the relative flow rates of the first and second incompressible fluids; and, selectively proportioning the back pressure, unaltered, between the concurrent first and second sensing steps such that the proportions of the back pressure sensed during each sensing steps is selectively adjusted, whereby the relative flow rates of the first and second incompressible fluids is adjusted in proportion of the back pressure sensed in the first and second sensing steps without adjusting the mixed fluid flow rate.

* * * * *